US009858330B2

(12) United States Patent
Henry

(10) Patent No.: US 9,858,330 B2
(45) Date of Patent: Jan. 2, 2018

(54) CONTENT CATEGORIZATION SYSTEM

(71) Applicant: Agile Legal Technology, Missoula, MT (US)

(72) Inventor: Joel E Henry, Missoula, MT (US)

(*) Notice: Subject to any disclaimer, the term of this patent is extended or adjusted under 35 U.S.C. 154(b) by 392 days.

(21) Appl. No.: 14/519,037

(22) Filed: Oct. 20, 2014

(65) Prior Publication Data

US 2015/0142811 A1  May 21, 2015

Related U.S. Application Data

(60) Provisional application No. 61/893,372, filed on Oct. 21, 2013.

(51) Int. Cl.
*G06F 17/30* (2006.01)

(52) U.S. Cl.
CPC ............................ *G06F 17/30598* (2013.01)

(58) Field of Classification Search
CPC ........... G06F 17/30705; G06F 17/2705; G06F 17/3071
See application file for complete search history.

(56) References Cited

U.S. PATENT DOCUMENTS

| | | | | |
|---|---|---|---|---|
| 6,363,174 B1* | 3/2002 | Lu | ....................... | G06F 17/277 382/209 |
| 7,185,001 B1 | 2/2007 | Burdick et al. | | |
| 7,213,205 B1 | 5/2007 | Miwa et al. | | |
| 7,702,665 B2* | 4/2010 | Huet | ................. | G06F 17/30684 707/602 |
| 8,286,240 B2* | 10/2012 | Liu | .................. | G06F 17/30705 707/731 |
| 8,510,832 B2 | 8/2013 | Liu et al. | | |
| 9,098,487 B2* | 8/2015 | Beretta | ................. | G06F 17/273 |
| 2004/0088157 A1* | 5/2004 | Lach | .................. | G06F 17/2785 704/9 |
| 2005/0065947 A1* | 3/2005 | He | ...................... | G06F 17/2795 |
| 2006/0282257 A1* | 12/2006 | Huet | ................... | G06F 17/2785 704/9 |
| 2007/0106499 A1* | 5/2007 | Dahlgren | .......... | G06F 17/30401 704/10 |
| 2009/0276850 A1 | 11/2009 | Peng | | |
| 2015/0161144 A1* | 6/2015 | Goto | ................... | G06F 17/3071 707/739 |
| 2015/0254332 A1* | 9/2015 | Hattori | ................ | G06F 17/3071 707/737 |

OTHER PUBLICATIONS

Alfio Gliozzo, Carlo Strapparava; "Semantic Domains in Computational Linguistics"; 1998.
(Continued)

*Primary Examiner* — Debbie Le
(74) *Attorney, Agent, or Firm* — Timberline Patent Law Group

(57) ABSTRACT

Representative implementations of devices and techniques provide a system for categorizing electronically stored information without the need for user input, direction, or guidance. In an implementation, the system determines meanings of input textual data items and groups of textual data items, identifies equivalent meanings between textual data items and between groups of textual data items, and outputs user-selected information that is categorized, indexed, and searchable.

20 Claims, 10 Drawing Sheets

(56) References Cited

OTHER PUBLICATIONS

Amelie Kutter, et al; "Corpus-Based Content Analysis: A Method for Investigating News Coverage on War and Intervention"; Jan. 2012.
An-Shou Cheng, et al; "Advancing Social Science Research by Applying Computational Linguistics" ; Jun. 2009.
Cathleen Kantner et al; "How to Get Rid of the Noise in the Corpus: Cleaning Large Samples of Digital Newspaper Texts"; Feb. 2011.
Roberto Franzosi; "Content Analysis: Objective, Systematic, and Quantitative Description of Content"; Nov. 2007.

* cited by examiner

CONTENT CATEGORIZATION SYSTEM

PRIORITY CLAIM AND CROSS-REFERENCE TO RELATED APPLICATION

This application claims the benefit under 35 U.S.C. §119(e)(1) of U.S. Provisional Application No. 61/893,372, filed Oct. 21, 2013, which is hereby incorporated by reference in its entirety.

BACKGROUND

Various methods exist for analyzing data of all sorts, including electronic documents, for instance, via a technology-based system. However, many of these methods require information, direction, specification, or example documents to be reviewed by a human user and submitted to the system prior to any automated document analysis. Relying on the user input, these systems can use existing methods to search through un-reviewed documents to find documents that in some way "match" the information, direction, specification, or example documents provided to the system by the user.

In such systems, the accuracy and efficiency of the system generally relies on the quality (and often the quantity) of the information, direction, specification, or example documents provided. For example, in some cases, the information provided by a human user may not result in the optimal search results. Additionally, gathering the best example documents for submission to the system can be a time consuming and otherwise inefficient process in itself.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Introduction

Figure 1:
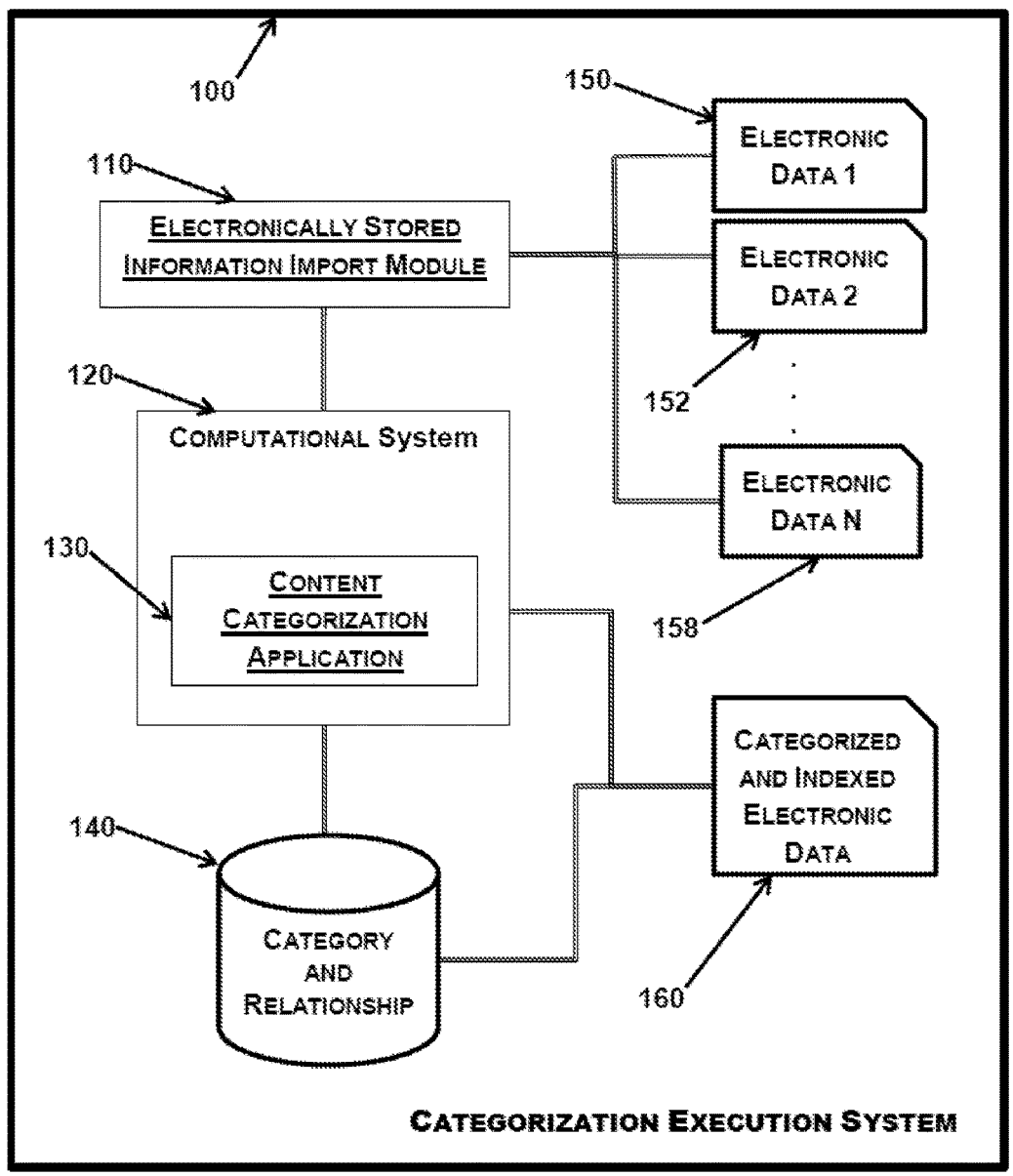
FIG. 1 is a block diagram of an example execution system for categorizing electronically stored information in accordance with various embodiments.

Representative implementations of devices and techniques provide a system for categorizing electronically stored information without the need for user input, direction, or guidance. In various embodiments, a combination of system components uses natural language analysis, information theory techniques, and/or the like, to concurrently analyze multiple textual data items (e.g., textual tokens) and multiple textual data item groups (e.g., words, phrases, textual token groups and/or sequences, etc.) with a hardware-software co-design. In an implementation, the system determines possible meanings of the textual data items and groups of textual data items, and identifies equivalent meanings between textual data items and between groups of textual data items.

In an embodiment, equivalent meanings are utilized to place electronically stored information into content categories identified by meaning. In another implementation, relationships between content categories are also identified concurrently with content categorization. In the implementation, once data items have been analyzed, categorized, and relationships identified, the system performs an analysis (e.g., utilizing parallel processing in some embodiments to save time) to resolve any content ambiguity and to refine relationships.

In an implementation, the content categories and the identified relationships are reviewed (e.g., by a user) upon completion of categorization. For example, such review can allow the user to refine the assigned content categorization and/or the identification of relationships between content categories of the electronically stored information. User review may include marking data items, text, or categories of electronically stored information.

In an implementation, the user can locate, review, and mark electronically stored information of interest based on content categories and relationships between data items, text, and categories without the need to manually review each and every individual electronically stored information item. At any time, for instance at the conclusion of review, the user can export electronically stored information as data items in one or more formats, categories of electronically stored information in multiple formats, relationships, data, and measurements between and among categories, electronically stored information, and data items. In an embodiment, the user can export the information quickly, confident that unselected electronically stored information does not contain content of interest and that textual data categories selected for export will provide the information needed by the user.

In various implementations, the disclosed techniques and systems are arranged to identify sequences of textual tokens (text characters, digits, symbols, punctuation, or other single character textual input), groups of textual tokens, words, phrases, sentences, etc. across multiple data sources, which have equivalent meaning, based entirely on relationships captured from the data set. There are no predefined token, group, word, phrase, or sentence relationships, no preset user inquiries, and no seed sets needed to train the system. The system identifies sequences of words with equivalent meaning without dependence on exact word matches. With such equivalencies a user gains the following functional benefits:

Searches return emails, documents, text files, etc. with equivalent content because equivalent phrases and sentences result from the search, not based on exact word matching or logic connecting exact word matches.

When a user finds a token group, phrase or sentence with content they wish to mark in some way (relevant, non-relevant, critically important, etc.), the user can mark that token group, phrase or sentence. Such a marking will then be applied to all token groups, phrases and sentences, with equivalent meaning, and the marking will then be applied to all emails and documents containing these equivalent token groups, phrases and sentences.

A user need not review all the emails and document containing the equivalent content but instead can separate these data sources quickly and easily.

A user can quickly remove large numbers of irrelevant emails and documents from the data set by marking a small number of irrelevant emails and documents. Once an irrelevant email or document is marked A user can specify the content of interest as an inquiry in free form text. This inquiry can then be used to generate content sequences which are then compared for equivalence across a large data set. This allows a user to repeatedly screen a changing or streaming data source for emails or documents of interest.

When a user marks a token group, phrase or sentence, that marking is compared with marking from equivalent token groups, phrases or sentences. If such markings are inconsistent, the user can be prompted to correct current or previous markings and thus greatly improve user accuracy and consistency. Or, if the user determines token groups, phrases or sentences marked equivalent are in fact not equivalent, the user can separate token groups, phrases or sentences into new equivalency relationships which are then applied across the data set to gain more precise categorization of content.

Content equivalencies across data sources allow capture of equivalent token groups, phrases or sentences even when words are misspelled, acronyms sometimes replace words, individuals are referred to with different names (i.e. Rob, Robert, Robby), and when documents have been put through an OCR process, which can be quite poor.

In the various implementations, sequences of token groups, (e.g., words, etc.) may, but need not be, directly adjacent token groups as there can be token groups between the token groups in the sequence. The system determines which sequences have equivalent meaning based on:

common token group (e.g., word, etc.) position within a sequence. For example, ran used in the same word position within the same sequence of words as the word walked is used: sequence 1: eric, ran, park, Saturday; sequence 2: eric, walked, park, Saturday. These equivalencies can extend further: E, ran, park, Saturday is equivalent to E, walked, park, Sat.

word equivalence derived from the data-driven thesaurus created for each data set. For example: ran used as the second word as often as moved used as the second word. "As often" may be defined as within 5% of the frequency, for instance (or other predefined amount) that each was used, then ran and moved are considered equivalent when used in the same context (position within the word sequence, with equivalent words around it).

word sequences preceding and succeeding each sequence of words. For example, if the word sequences were S1, S2, S3 and later the sequence was S1, S4, S3, then S2 is equivalent to S4. Further, if S1 were equivalent to S7, then S7, S2, S3 would again make S2 equivalent to S4.

In various implementations, the disclosed techniques and systems are also arranged to:

Parse a data source and capture sequences of 3-5 words from a data source, ignoring a set of words such as "of," "the," "an," etc.

Store each token group (e.g., word, etc.) sequence in a database and retain indices to each sequence and each word in each sequence. This permits subsequent sequences and words to be found quickly and marked equivalent quickly.

When two different words both begin the same otherwise equivalent sequence of words, the words are equivalent. Both words receive the same index and therefore can be used interchangeably in future comparisons. Further, the sequences are considered equivalent and receive the same index. Future comparisons then use the index and not a word by word comparison.

When two different words occur in the same position within two multiword sequences with otherwise equivalent words, the different words occupying the same position are marked equivalent and given the same index. Further, the sequences are considered equivalent and receive the same index.

Once equivalencies have been established, user markings can be propagated through the data set when marking data items as follows:

If a user marks data item (i.e email or document), that marking remains for the item and can only be changed by subsequent user marking of the item.

If a user marks an item non-relevant, all unmarked equivalent content within all items that contain equivalent content are marked non-relevant.

If a user marks a sequence of words within an item, content equivalent to the user-marked word sequence is marked with the user marking across the entire data set.

If all content within an item is marked the same, that item receives that marking.

If the item has content previously marked privileged, user defined, or relevant, prompt the user with the conflict, showing the conflicting content and asking the user to confirm or ignore their marking of the item.

Once equivalencies have been established, user markings can be propagated through the data set when marking content categories as follows:

"Privileged" trumps all other markings
         if a category is marked privileged, all unmarked equivalent categories are marked privileged, then all items in that category and all equivalent categories are marked privileged; user marks for an item which a user reviewed and marked are never changed by category markings if even one of the categories of an unmarked item is marked privileged, the item is marked privileged and is not changed by subsequent category markings; the marking is only changed if the user marks the e-item User defined markings trump relevant and non-relevant
if a category is marked as user-defined, all unmarked items and all category marked e-items with markings of relevant or non-relevant in that category are marked user-defined; the marking is never changed by a category marking of relevant or non-relevant, only by a category marking of privileged or a user-defined marking
if even one of the categories of a category marked item is marked with user-defined, the item is marked user-defined and is not changed by subsequent relevant or non-relevant category markings; it is only changed if
the user marks the e-item
a subsequent category marking for the e-item is marked privileged, then the privileged rules apply "Relevant" trumps non-relevant
if the category is marked as relevant, all unmarked e-items and all category marked e-items with markings of non-relevant in that category are marked relevant; the marking is never changed by a category marking of non-relevant, only by a category marking of privileged or user-defined, or a user marking
if even one of the categories of category marked e-item is marked relevant, the e-item is marked relevant and is not changed by subsequent non-relevant category markings; it is only changed if the user marks the e-item
a subsequent category marking for the e-item is marked privileged or user defined, then the privileged rules OR user defined apply Non-relevant
if the category is marked as non-relevant, all unmarked equivalent categories are marked non-relevant.

The above procedures, techniques, and results are examples, and are not intended to be limiting, but are illustrations for the purposes of discussion. In alternate implementations, variations of the above procedures and techniques can be used to obtain desired, like, or similar results. Further, in some embodiments, the procedures and techniques may not include all of the provisions, or may include more or alternate provisions, and obtain the same or similar results.

Implementations are explained in more detail below using a plurality of examples. Although various implementations and examples are discussed here and below, further implementations and examples may be possible by combining the features and elements of individual implementations and examples.

Example Categorization Execution System

Referring to FIG. 1, there is shown an example Categorization Execution System 100 in accordance with various embodiments. In the various embodiments, the system 100 receives input in the form of Electronic Data items 150, 152 . . . 158, and produces output such as Categorized and Indexed Electronic Data 160, search results, analytics, categories, lists, and the like, in user specified formats, including plain text, word processing formats such MICROSOFT WORD, PDF, or other user defined file formats, and/or electronic display on a user interface of a computing device (such as a mobile device, for example).

In an implementation, the system 100 includes an Electronically Stored Information (ESI) Import Module 110 which imports one or more items of Electronic Data 150, 152 . . . 158 into the system 100. In various embodiments, the data items 150, 152 . . . 158 may be local to the execution system 100 or available through a wired or wireless network. Accordingly, in the various embodiments, the import module 110 is arranged to import the data items 150, 152 . . . 158 via the wired or wireless network (for example, via the Internet, an intranet, a LAN, WAN, etc.). The import module 110 may import millions, billions, or even trillions of items of Electronic Data 150, 152 . . . 158 as represented in FIG. 1 using direction from the user, direction from other systems, or direction from a combination of both.

In various embodiments, Electronic Data 150, 152 . . . 158 comprises data items such as electronic documents, electronic mail, text messages, data from a database, or any electronically stored information (e.g., content of a web page, etc.). Such data items 150, 152 . . . 158 can be stored locally, remotely, or acquired through a stream of data provided through a communication channel, or in a way that allows data items 150, 152 . . . 158 to be made available to the Computational System 120.

In an implementation, as shown in FIG. 1, the system 100 includes a Multiple Processor Computational System 120, arranged to execute analysis algorithms, process requests, output results, and the like, with respect to the Electronic Data 150, 152 . . . 158. In various embodiments, the Computational System 120 may comprise a multi-processor computer chip or multiple computing devices connected by a bus, local network, or other communication system. In further embodiments, the Computational System 120 comprises a distributed multiple processor network connected by a communication network. In an alternate implementation, the Computational System 120 comprises a single processor, or the like.

In an implementation, the Content Categorization Application 130 is allocated to multiple (or single) processor(s). In an embodiment, the Content Categorization Application 130 performs analysis routines via the Computational System 120. For example, in an implementation, the Content Categorization Application 130 comprises processor-executable instructions, that when executed on the one or more processors of the Computational System 120, the Content Categorization Application 130 performs one or more analysis routines (as further described below) to analyze and categorize Electronic data items 150, 152 . . . 158. In an implementation, the Content Categorization Application 130 transforms Electronic data items 150, 152 . . . 158 from a set of text and other data into a categorized organization of data based on the meanings of text and other data.

In an implementation, the Content Categorization Application 130 may utilize multiple processors (if available) of the Multiple Processor Computational System 120 to produce the Categorized and Indexed Electronic Data 160. In an embodiment, the Categorized and Indexed Electronic Data 160 includes items and relationships between data items 150, 152 . . . 158, electronically stored information, and categories, as well as other data, which can be stored, for example, prior to exporting. Such other data may include indices capturing relationships among and between data items 150, 152 . . . 158, electronically stored information, and categories, as well as other data (e.g., metadata, etc.).

Such indices may be used to find data items 150, 152 . . . 158, electronically stored information, and categories, as well as other data quickly.

The Categorized and Indexed Electronic Data 160 can be exported in a variety of forms, formats, and general representations. Exported Categorized and Indexed Electronic Data 160 can include reports specifying the size, content, analytics, information theory calculations, review history, and other information useful to the user in understanding and describing the exported Categorized and Indexed Electronic Data 160. In an implementation, exported data produces for a user a data set based on the meanings of the text and other data within the set of imported data items 150, 152 . . . 158. The transformation from imported data to categorized data allows the user to export data based on meaning of text and data within the data item set.

In an embodiment, the Content Categorization Application 130 stores category and relationship data as well as analytics and information theory measurements (such as entropy and probabilities, for example) in the Category and Relationship Database 140. In various implementations, the database 140 may be a commercial database, custom database, file repository, or other organization of data and data relationships. In an embodiment, the Categorization Execution System 100 transforms structured and unstructured data into an organized set of content categories containing electronically stored information, data items 150, 152 . . . 158, and other data with equivalent meaning. This transformation results in electronically stored information, data items 150, 152 . . . 158, and other data organized by the meaning of the textual data items 150, 152 . . . 158 and not the specific textual data items 150, 152 . . . 158 present.

In alternate implementations, a Categorization Execution System 100 may include fewer components, additional components, or alternate components to perform the functions discussed herein, or for other desired functionality.

Example Computational System

Figure 2:
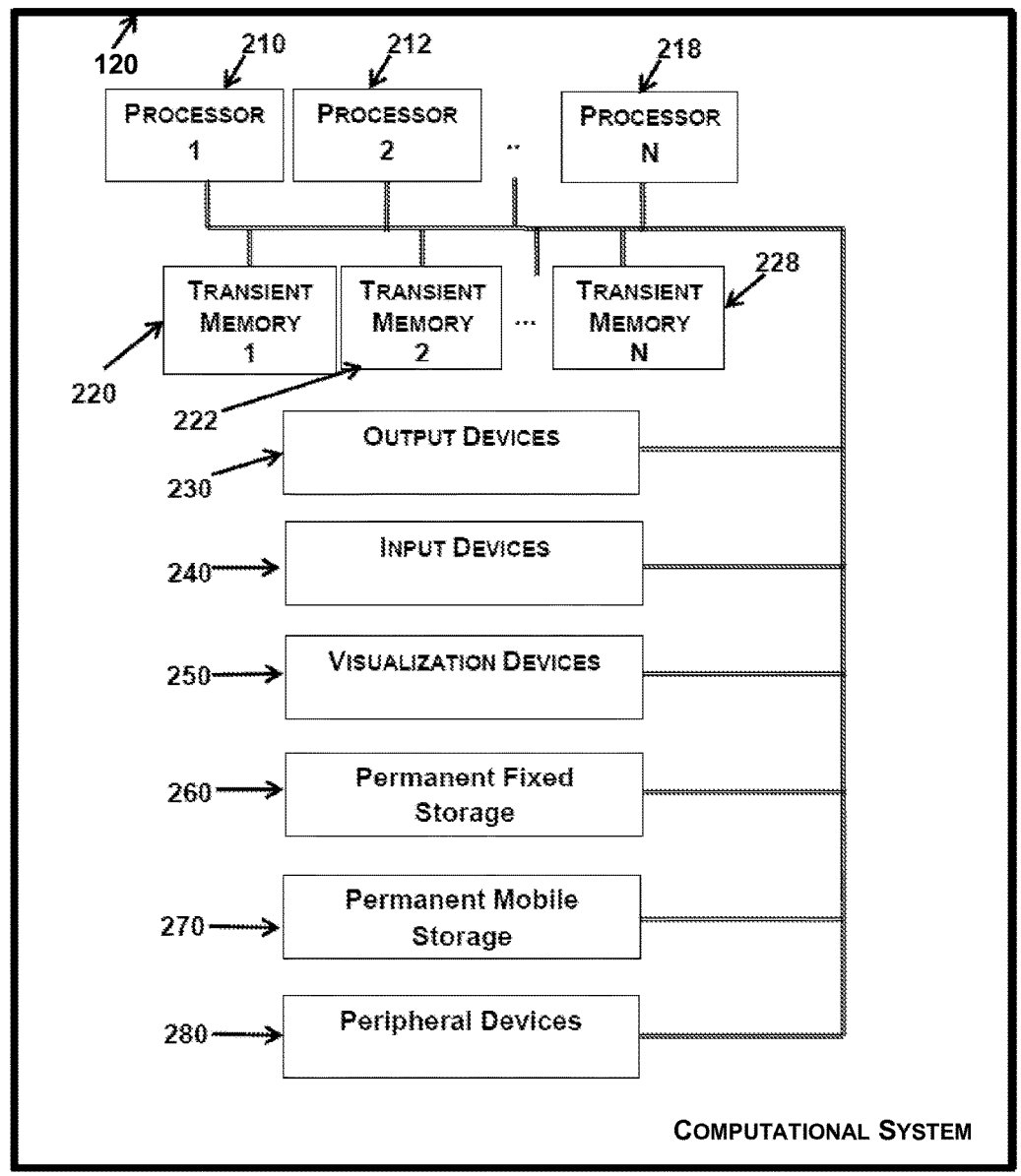
FIG. 2 is a block diagram of an example configuration of one or more computing devices for categorizing electronically stored information in accordance with various embodiments.

Referring to FIG. 2, there is shown an example Computational System 120 arranged to provide document categorization, for example. In an implementation, the Computational System 120 includes two or more Processors 210, 212 . . . 218. In an alternate implementation, the Computational System 120 includes a single Processor 210, 212 . . . 218. In various embodiments, the Processors 210, 212 . . . 218 may be physically present in a single computing device, be interconnected by a bus, a local or distributed network, or other electronic communication method, or be any combination of methods.

In an implementation, as shown in FIG. 2, the computational system 120 includes one or more memory storage devices 220, 222 . . . 228. In an embodiment, the Processors 210, 212 . . . 218 utilize one or more Transient Memory 220, 222 . . . 228 banks, caches, or other transient (not utilized for permanent long-term storage) memory 220, 222 . . . 228 to store instructions and data needed to achieve computational performance. For example, in one implementation, executable instructions for the Processors 210, 212 . . . 218 are stored in one or more of the memory 220, 222 . . . 228 and other data is stored in one or more of the other, or the same, memory 220, 222 . . . 228.

In an implementation, as shown in FIG. 2, the computational system 120 includes one or more Output Devices 230. In various embodiments, the Output Devices 230 includes communication components, human/machine interface components, a visual and/or touch display driver or device, or the like. In another implementation, as shown in FIG. 2, the computational system 120 includes one or more Input Devices 240. In various embodiments, either of the Output Devices 230 and/or the Input Devices 240 may be standard hardware items, proprietary hardware items, or any combination of both types.

In an implementation, one or more Visualization Devices 250 may be included with, attached to, or available through a bus, communication network, or other communication mechanism, to the computational system 120. In some examples, devices 240 and 250 may provide data items 150, 152 . . . 158 to the ESI import module 110.

Multiple types of permanent storage may be included in the computational system 120. Permanent Fixed Storage 260 and Permanent Mobile Storage 270 are examples. Permanent Fixed Storage 260 may include, but is not limited to, hard drives, servers, and other types of storage primarily meant to be fixed in place, but can be moved if needed, and intended for storage between executions of the embodiment. Permanent Mobile Storage 270 includes hard drives, flash memory, disks, tapes, and other types of storage primarily meant to be mobile (to be moved from place to place yet permanently store data), but can be fixed in place if needed, and intended for storage between executions of the system 100. For example, the Category and Relationship Database 140 and/or the Content Categorization Application 130 may be stored on the storage devices 260 and/or 270.

In an implementation, the computational system 120 may include Peripheral Devices 280, such as fingerprint readers, bar code readers, mobile computing devices such as phones, and all other such hardware devices that can serve as input, output, or storage devices.

In various implementations, the computational system 120 may comprise one of many types and designs of mobile devices capable of receiving and sending messages (such as text messages, multimedia messaging service (MMS) messages, enhanced messaging service (EMS) messages, short message service (SMS) messages, and the like), displaying text and/or graphics, producing audible tones, displaying video, and the like. In some implementations, the mobile device 102 may comprise such devices including, but not limited to: a mobile phone, a smart phone, a tablet device, a set top box, a personal digital assistant (PDA), or the like.

In an implementation, the mobile device may include a User Interface and/or display 250, one or more Processors (CPU, GPU, etc.) 210, 212 . . . 218, an Output Device 230, and a Memory 260, 270. Each of these components may be coupled to a bus structure, such that each component is capable of communicating with or transferring data to and/or from the other components. In various implementations, the Memory 260, 270 may be fully integrated to the mobile device (one or more integrated memory storage devices), or a portion of the Memory 260, 270 may be portable, removable, remote, or the like (such as a memory storage expansion "SD card," or similar).

In one implementation, the Memory 260, 270 stores a mobile operating system (OS) and one or more mobile applications ("apps") such as the Content Categorization Application 130. Additionally, the Memory 260, 270 may also store data for the OS or the apps in a Database 140, or other storage organization type.

In alternate implementations, a mobile device may include fewer components, additional components, or alternate components to perform the functions discussed, or for other desired functionality.

Example Implementations

In various implementations, electronically stored information (ESI) comprises information within data items 150, 152 . . . 158. For example, ESI includes text, images, metadata, and other similar components of data items 150, 152 . . . 158. Data items 150, 152 . . . 158 are the source files that are imported by the electronically stored information import module 110, and include such items as document files, emails, records, web pages, and the like.

In the implementations, ESI are comprised of textual tokens, which include text characters, digits, symbols, punctuation, or other single character textual input. In an embodiment, the system 100 groups textual tokens into textual groups for analysis. For example, the groups of textual tokens (which may include words, phrases and/or sentences, as well as sets, sequences, and arrangements, etc. of textual tokens) may be analyzed to find equivalent meaning across multiple textual groups, as discussed further below. In an example, indices can be used to maintain these equivalencies as well as the connection to the data items 150, 152 . . . 158 where the textual groups occur.

Figure 3:
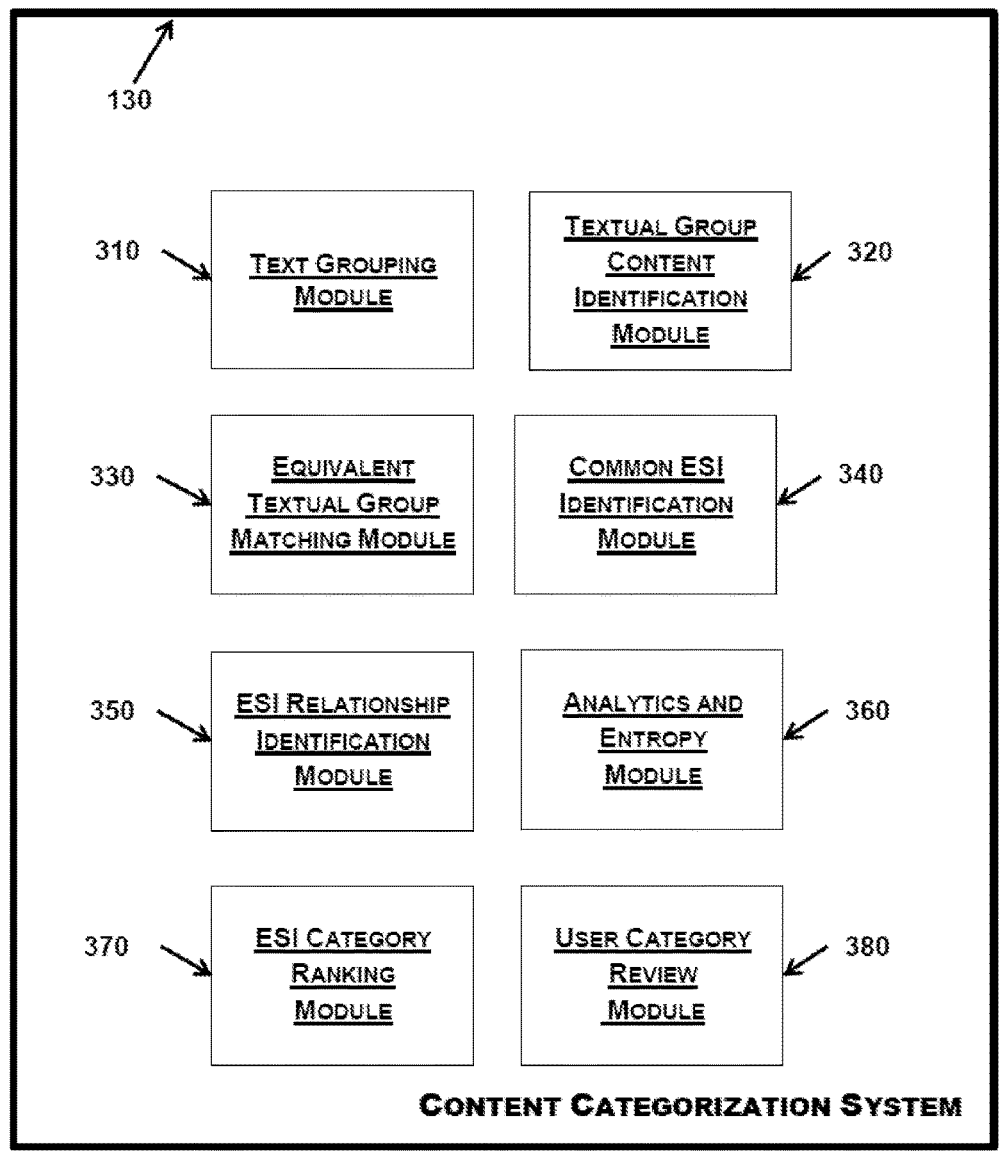
FIG. 3 is a block diagram of example system architecture for the electronically stored information categorization system, according to an implementation.

Referring now to FIG. 3, there is shown an Example Architecture for Content Categorization System 130, as was shown in FIG. 1, Categorization Execution System 100. FIG. 3 shows further details of an embodiment of the Content Categorization System 130, which may include more or less modules for performing the methods described herein. Embodiments of the Content Categorization System 130 may include Text Grouping Module 310 which selects and combines textual tokens (such as combinations of characters, numbers, punctuation, symbols, or other single character textual input) or textual tokens of different languages into groups (which are sequences of two or more textual tokens), which may include a mix of languages (e.g., two English words and two Spanish words) that are amenable to content analysis. In an implementation, the textual tokens are detected by the Content Categorization System 130 from the imported electronic data 150, 152 . . . 158.

In an embodiment, content analysis may be performed by Textual Group Content Identification Module 320, a module that identifies the meaning of textual tokens and group of textual tokens using one or more thesaurus files created during analysis of the data set. For example, in an embodiment, the thesaurus files are not preloaded from an existing source, but are generated from analyzing the imported data 150, 152 . . . 158. In an implementation, content of a textual token group is identified by the sequence of textual tokens and their positional relationship to each other.

In order to identify multiple textual token groups within ESI with equivalent meaning, some embodiments use an Equivalent Textual Group Matching Module 330. Textual token groups have the same meaning if the textual tokens in each position within each textual token group have equivalent meaning or are variations of the same textual token (e.g., run and ran). Two textual token groups are identified as equivalent if the two textual token groups occur in the same position within two sequences of textual token groups, where the surrounding textual token groups have been identified as equivalent.

Once equivalent textual token groups have been identified, some embodiments utilize Common ESI Identification Module 340 integrating natural language processing and information theory to identify common categories of ESI across multiple data items 150, 152 . . . 158, where common ESI may occur in multiple data items and data items may have multiple common ESI. Some embodiments utilize a database and indices to capture, store, and organize common ESI category—data item relationships for fast and accurate retrieval of these relationships.

An example embodiment utilizes an ESI Relationship Identification Module 350 to identify multiple, distinct ESI as being related based on common meaning across multiple data items 150, 152 . . . 158. The relationships identified allows the embodiment to quickly use indices to identify ESI relationships across the data items 150, 152 . . . 158 which provide further meaning of the content of multiple data items 150, 152 . . . 158 as a whole.

Continuing with FIG. 3, some embodiments use an Analytics and Entropy Module 360 to calculate the frequency of textual tokens, textual token groups, equivalent textual token groups, common content, strength of relationships, rankings of categories, accuracy, precision, confidence intervals, and other needed analytics and information theory calculations to guide user review. These calculations in some embodiments may be purely based on the ESI imported, be based partly on quantities stored in one or more thesaurus files, or be derived from a combination of both.

Entropy and information theory calculations may be used in an embodiment by an ESI Category Ranking Module 370 to rank the categories based on statistical confidence, information diversity, and/or other calculations. Entropy may include measurement of the diversity of textual tokens and textual token groups within ESI and other data items 150, 152 . . . 158, frequency of textual tokens, textual token groups, textual token groups, and textual token group sequences. Less diverse textual token groups and\or textual token group usage may indicate more equivalent meaning across ESI and other data items 150, 152 . . . 158 and thus increase the confidence in equivalent meaning across textual token groups. In some embodiments the confidence in equivalent meaning drives the rankings presented to the user, with other useful information about categories of ESI and other data items 150, 152 . . . 158.

In some embodiments a User Category Review Module 380 allows one or more users to mark (via an input device 240, a user interface 250, or the like) categories of equivalent textual token groups, individual textual token groups, and individual data items 150, 152 . . . 158 with designations useful to the user. Such designations then can be propagated through the data items 150, 152 . . . 158 utilizing stored indices to designate equivalent textual token groups, categories of equivalent textual token groups, and data items 150, 152 . . . 158 with the same or a related marking.

Figure 4:
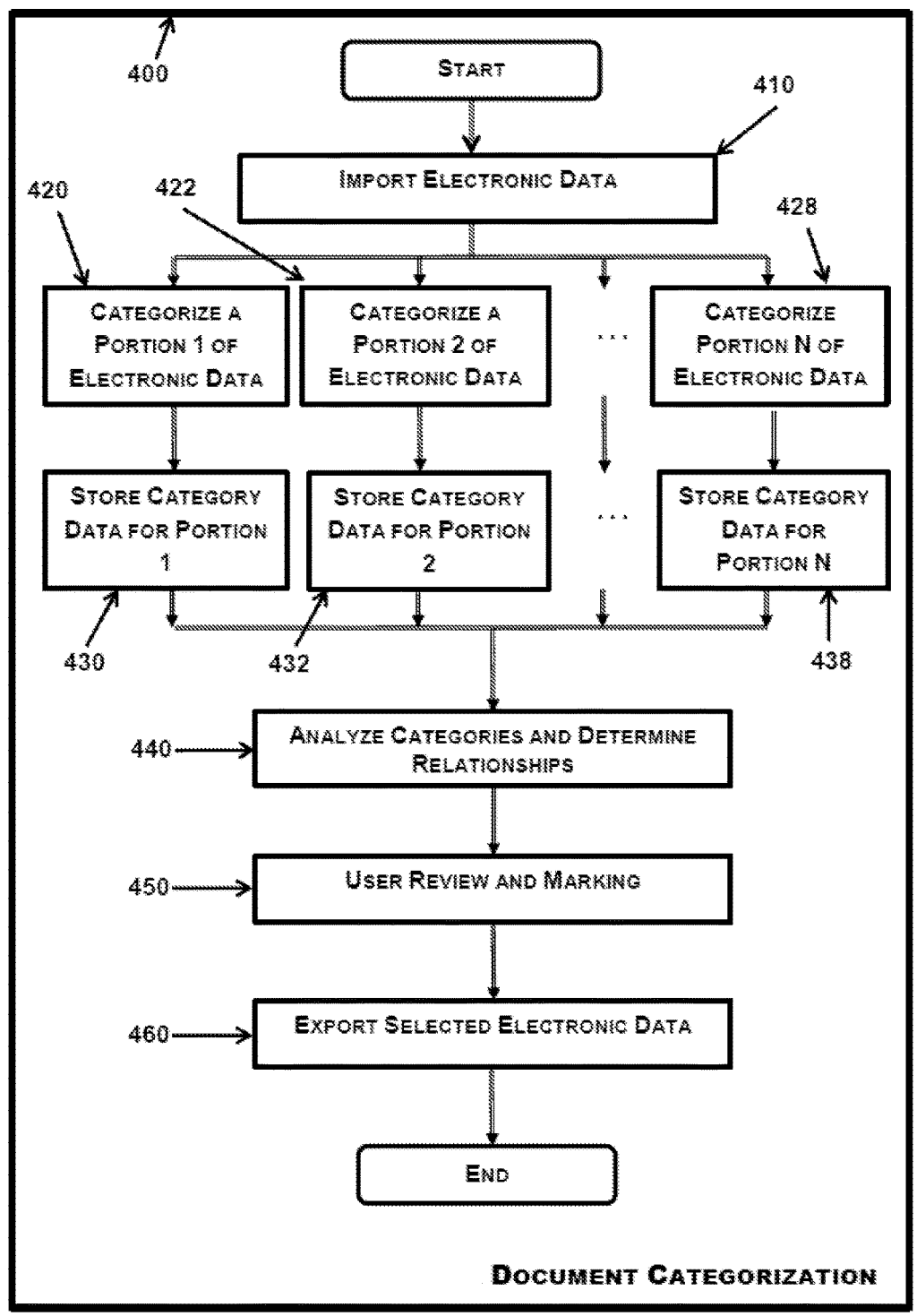
FIG. 4 is a flow diagram of an example method for categorizing electronically stored information, according to an implementation.

Moving on to FIG. 4, Control Flow Diagram for Document Categorization 400 shows an example control flow of the content categorization system 130. Control starts with the Import Electronic Data 410 which reads ESI from one or more data items 150, 152 . . . 158. Such items may be located on the computing system 120 executing the categorization system 130, may be located on fixed or mobile storage devices (260, 270) attached or accessible from the computing system 120, or may be accessible through a bus, communication network, an internet connection, or any communication channel accessible to the computing system 120.

In some embodiments, as the Import Electronic Data 410 module accesses ESI, one or more Categorize a Portion of Electronic Data 420, 422 . . . 428 steps begin the categorization of electronically stored data. The Categorize of Electronic Data 420, 422 . . . 428 steps may perform functions concurrently in order to categorize electronically stored data quickly. Once a user has designated textual token groups, ESI, or data items 150, 152 . . . 158 with a marking, in some embodiments that marking may be propagated to newly imported data items 150, 152 . . . 158 during import by applying the marking to equivalent textual token groups, ESI, and data items 150, 152 . . . 158.

Similarly, in this embodiment the Store Category Data 430, 432 . . . 438 steps perform storage functions concurrently, although this could be done sequentially when implemented on a single processor. While each Categorize of Electronic Data 420, 422, . . . 428 action operates on a distinct portion of ESI, the Store Category Data 430, 432, . . . 438 steps may perform storage for one or more Categorize a Portion of Electronic Data 420, 422, . . . 428 steps. Parallel storage may be performed without delaying categorization of newly imported ESI by Categorize a Portion of Electronic Data 420, 422 . . . 428 steps. Sequential storage operations may be used in embodiments with a single processor.

Continuing with FIG. 4, an embodiment of the Control Flow Diagram for Document Categorization 400 process includes Analyze Categories and Determine Relationships 440 which performs calculations following categorization of textual token groups, ESI, and data items 150, 152 . . . 158 and storage of categories, textual token groups, and data item information. These calculations may include entropy, frequency, probability, and diversity of textual tokens, textual token groups, categories, ESI, and data items 150, 152 . . . 158, as well as other data. In an implementation, the Control Flow Diagram for Document Categorization 400 performs calculations upon textual token groups, categories, ESI, and data items 150, 152 . . . 158 as well as textual token group, category, ESI, and data item relationships, captured during categorization, and in some embodiments utilizes concurrency to simultaneously perform calculations.

Additionally, as shown in FIG. 4, the Control Flow Diagram for Document Categorization 400 process includes User Review and Marking 450. In some embodiments, the User Review and Marking 450 step allows users to review textual tokens, textual token groups, categories, data items 150, 152 . . . 158, equivalent textual tokens, textual token groups, categories, and data items 150, 152 . . . 158, and, textual tokens, textual token group, category, and data items 150, 152 . . . 158 relationships, as well as user markings, for accuracy. The user may receive guidance and suggestions from the system 100 where equivalence, marking, and categorization actions by the user appear to be inconsistent based on entropy and other calculations, previous user actions, and other data collected by the system 100.

In an embodiment, after review and marking, the user may export designated categories, textual token groups, and/or data items 150, 152 . . . 158 using the Export Selected Electronic Data 460 step. The export may include textual tokens, textual token groups, categories, and data items 150, 152 . . . 158 in a variety of electronic formats supplemented by data collected or calculated during analysis or user actions. An audit report may also be exported which provides information as to user actions within the system 100 during use.

Figure 5:
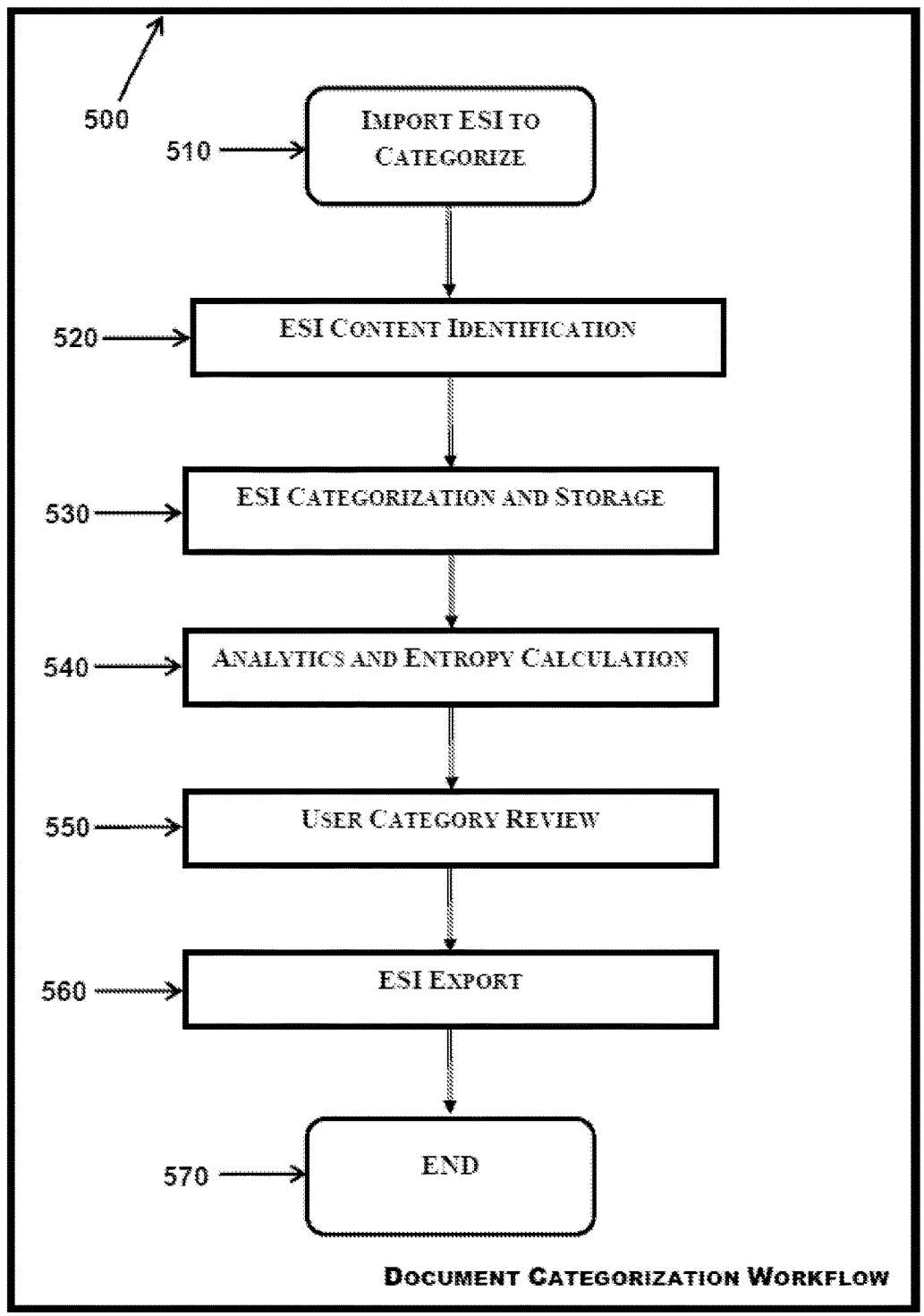
FIG. 5 is a workflow diagram of an example method for categorizing electronically stored information, according to an implementation.

FIG. 5 shows an example workflow diagram for categorizing documents, Document Categorization Workflow 500. The example Document Categorization Workflow 500 may include methods for capturing the content, or meaning, of textual data within data items 150, 152 . . . 158 for placement in categories based on equivalent meaning.

An embodiment may include an Import ESI to Categorize 510 step, which accesses files, directories, repositories, devices, and, in general, any storage where ESI may be located and in a variety of electronic formats. In an implementation, the ESI is read or otherwise imported (via the ESI import module 110) from one or more data items 150, 152 . . . 158. In this embodiment, such import reads text and other data from the data item(s) which may be grouped, analyzed, categorized, related, reviewed by one or more users, and exported in a variety of formats with associated analysis, review, and audit data. For example, a series of textual tokens imported from a data item might be: "Fred was involved in the NORCO contract" which results a series of textual tokens such as "Fred" "was" "involved" "in" "the" "NORCO" and "contract".

As ESI is imported, an embodiment of the process 500 may include an ESI Content Identification 520 step, which identifies one or more types of content from ESI imported from each data item by placing textual tokens into groups, identifying equivalent textual tokens, and identifying equivalent groups of textual tokens, within each data item. In an embodiment, content identification allows for grouping of equivalent content based on textual token group meaning. Continuing the example, the series of textual tokens previously imported might be placed in a group such as {"Fred" "involved" "NORCO" "contract"}. If import resulted in two additional groups of textual tokens, such as {"FM" "handled" "NORCO" "contract"} and {"Fred" "worked" "NORCO" "agreement"}, then all three groups of textual tokens would be considered to have equivalent content.

Once content has been identified within ESI, an embodiment of the ESI Categorization and Storage 530 can be used to place textual tokens, textual token groups, ESI, and data items 150, 152 . . . 158 into categories where textual tokens, textual token groups, ESI, and data items 150, 152 . . . 158 have equivalent meaning. Categorization in some embodiments will store categorization data for each textual token, group of textual tokens, ESI, and data item within a database or other repository for later use. ESI and other data items 150, 152 . . . 158 may be placed in more than one category if textual data within the ESI or data item contains content with multiple meanings. Again continuing the example, the data items 150, 152 . . . 158 containing the textual token groupings {"Fred" "involved" "NORCO" "contract"}, {"FM" "handled" "NORCO" "contract"}, and {"Fred" "worked" "NORCO" "agreement"} would be placed in the same category of equivalent content.

Continuing with FIG. 5, the Analytics and Entropy Calculation 540 step in this example embodiment uses quantitative data obtained during Import ESI to Categorize 510, ESI Content Identification 520, and ESI Categorization and Storage 530 to calculate analytics and entropy. Analytics such as textual token, textual token group, and textual token group sequence probabilities, textual token, textual token group, and textual token group sequence frequencies, and entropy calculation for textual token groups, sequences of textual token groups, and data items 150, 152 . . . 158, and other information calculations are calculated and stored. In an implementation, the analytics and entropy calculated in the Analytics and Entropy Calculation 540 step provide ranking, likelihood, and confidence intervals, as well as other accuracy of marking feedback to the user in the User Category Review 550 step. In the example above, continued here, calculations, frequency, probability, entropy, and diversity for textual tokens, textual token groups, textual token positions within textual token groups, and textual token group positions within sequences of textual token groups will be calculated. For example, "NORCO" will have a higher frequency while "FM", referring to "Fred" may have a lower frequency. However, the use of "FM" in the same position as "Fred" may be highly probable. These calculations support the identification of equivalency relationships.

In this embodiment the user has the ability to review textual token groups, categories, data items 150, 152 . . . 158, and the relationships between and among textual token groups, categories, and data items 150, 152 . . . 158 in the User Category Review 550 step. In this example step the user reviews by marking, confirming, re-categorizing, or eliminating categories from the analyzed data items 150, 152 . . . 158. Continuing the example, if the user marked the textual token group {"Fred" "involved" "NORCO" "contract"} as relevant, all textual token groups within the category that included {"Fred" "involved" "NORCO" "contract"} would be marked relevant, thus marking {"FM" "handled" "NORCO" "contract"}, and {"Fred" "worked" "NORCO" "agreement"} relevant as well as the all data items 150, 152 . . . 158 containing these textual word groups or their equivalents.

In this embodiment the user can initiate the ESI Export 560 step to export the categories and ESI needed for production, import into another software tool, or storable for further use. In this embodiment the export can be in a variety of formats including, but not limited to, native format matching the import data item format, in PDF format, or a variety of other data formats as needed. This example embodiment utilizes textual token group, category, and data item markings performed by the user and accomplished by propagation of user markings, or both. If the user selects all relevant data items 150, 152 . . . 158 for export, data items 150, 152 . . . 158 in categories marked relevant will be selected for export, whether the textual word groups or data items 150, 152 . . . 158 in those categories were directly marked by a user action or marked by propagating a user marking to equivalent textual word groups, categories, or data items 150, 152 . . . 158. Following the ESI Export 560 step within the Document Categorization Workflow 500, the workflow completes with Done 570.

As example embodiment in FIG. 5, the user may return to the User Category Review 550 step or the ESI Export 560 step at a later time in order to review categorized ESI. In this embodiment a user may review textual token groups, categories and data items 150, 152 . . . 158 in order to revise previous decisions or investigate new issues. Further, in this embodiment imported ESI can be augmented with additional ESI by importing new ESI from data items 150, 152 . . . 158 using Import ESI to Categorize 510 which will cause ESI Content Identification 520, ESI Categorization and Storage 530, and Analytics and Entropy Calculation 540 to re-execute and allow further review and ESI export.

Figure 6:
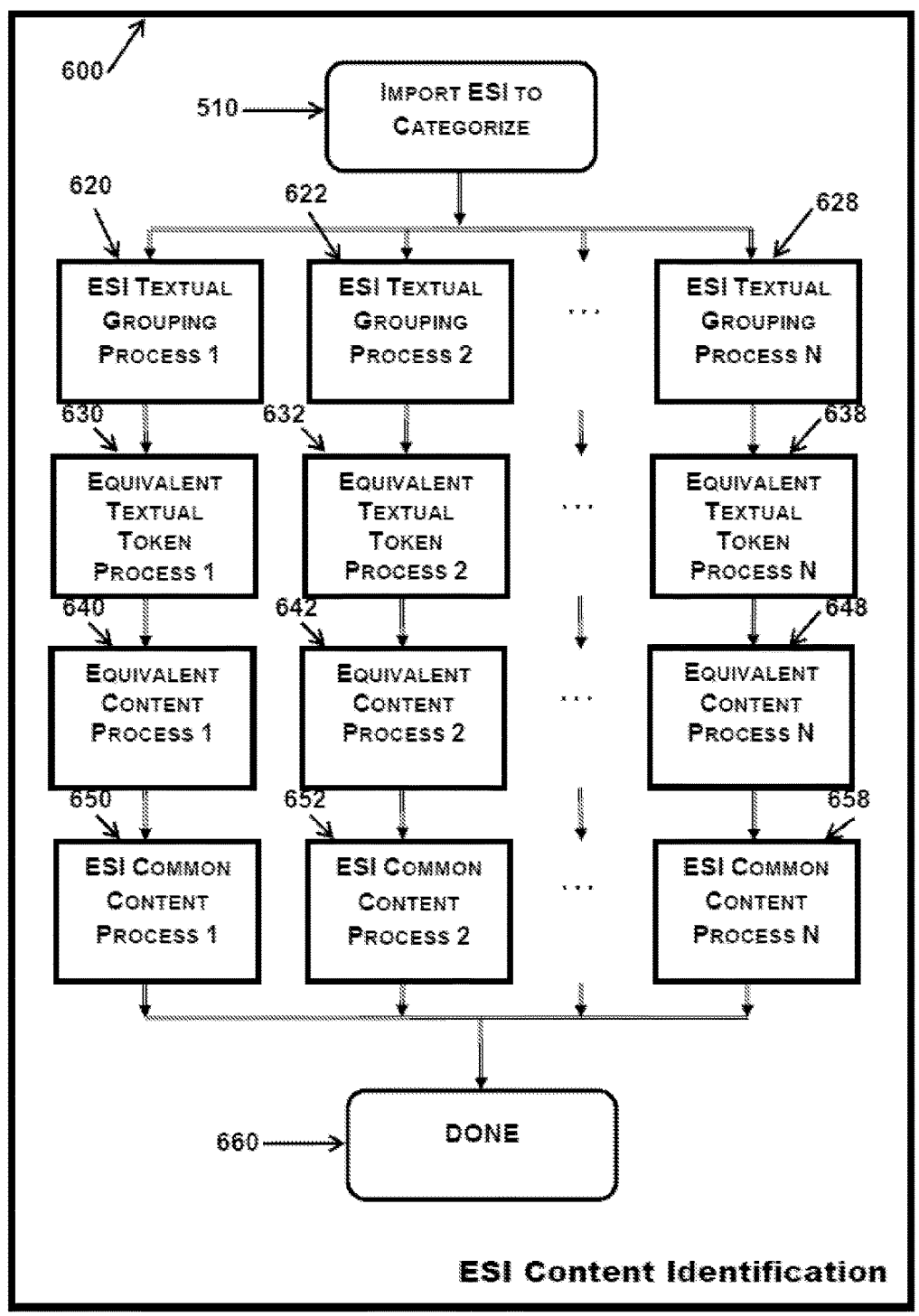
FIG. 6 depicts an example method for the content identification sub-workflow, according to an implementation.

FIG. 6 depicts an example embodiment of the Content Categorization Sub-workflow: ESI Content Identification 600 process for identifying content from data items 150, 152 . . . 158 containing ESI. In some embodiments, FIG. 6 may depict further steps that are included in the ESI Content Identification 520 of FIG. 5, Document Categorization Workflow 500.

Continuing with FIG. 6, an embodiment of ESI Content Identification 600 begins with the Import ESI to Categorize 510 step as depicted in FIG. 5, Document Categorization Workflow 500. In this embodiment, Import ESI to Categorize 510 accesses each ESI, Textual Grouping Process 1 620, ESI Textual Grouping Process 2 622, through ESI Textual Grouping Process N 628, which may execute concurrently on one or more processors. The number of processes depends on the number of processors available in the computing environment 120 of the system 100. In some embodiments only one processor may be used to perform Textual Grouping Process 620.

In this embodiment the ESI Textual Grouping Process 620 . . . 628 steps analyze textual data by position within a sequence of textual tokens and in relation to other textual data in one or more data items 150, 152 . . . 158 to identify a textual token group containing two or more textual tokens. In this embodiment the text within a data item is imported as a sequence of textual tokens which are grouped into a textual token group with meaning when grouped together. Some textual tokens such as "a," "an," and "the," among others, can be ignored when grouping textual tokens from a data item. While this embodiment benefits from parallel processing, some embodiments using a single processor can implement this step.

Again continuing with FIG. 6, in this example embodiment ESI Textual Grouping Process 620 . . . 628 steps produce groups of textual tokens, which are passed on to one or more Equivalent Textual Token Processes 630 . . . 638 steps to identify equivalent textual token within textual token groups. Equivalent textual tokens exist when two different textual tokens are found in the same position within two or more otherwise equivalent groups of other textual tokens. The differing textual token, or tokens, are deemed equivalent when two textual tokens occur in the same position or an equivalent position within two groups of textual tokens. Textual tokens are equivalent when found to be frequently used within two textual token groups, regardless of the position, or are variations of the same textual token (e.g., run and ran, you and U).

Equivalencies, when found in this embodiment will be stored for use in Equivalent Content Processes 640 . . . 648 steps. In this embodiment Equivalent Content Processes 640 . . . 648 steps determine equivalent textual token group content across textual token groups comprised of different textual tokens with equivalent meaning or different textual token sequences using equivalent textual tokens, or symmetrical textual token positioning, textual token type or frequency, and other data gathered in previous steps.

In an embodiment, Equivalent Content Process 640 . . . 648 steps identify equivalent content in ESI Common Content Process 650 . . . 658 steps. In some embodiments the ESI Common Content Process 650 . . . 658 identify common content across data items 150, 152 . . . 158 from equivalent textual tokens and textual token groups. Once ESI Common Content Process 650 . . . 658 steps are complete, the Content Categorization Sub-workflow: ESI Content Identification 600 completes. Completion of ESI Content Identification 600 in this embodiment results in identifying multiple categories of content within ESI and data items 150, 152 . . . 158. In addition, equivalent content may be found in multiple, different ESI and data items 150, 152 . . . 158. The transformation of textual token sequences to equivalent textual token groups, equivalent contents, and content relationships across ESI and data items 150, 152 . . . 158 ready for content categorization of ESI and data items 150, 152 . . . 158.

Figure 7:
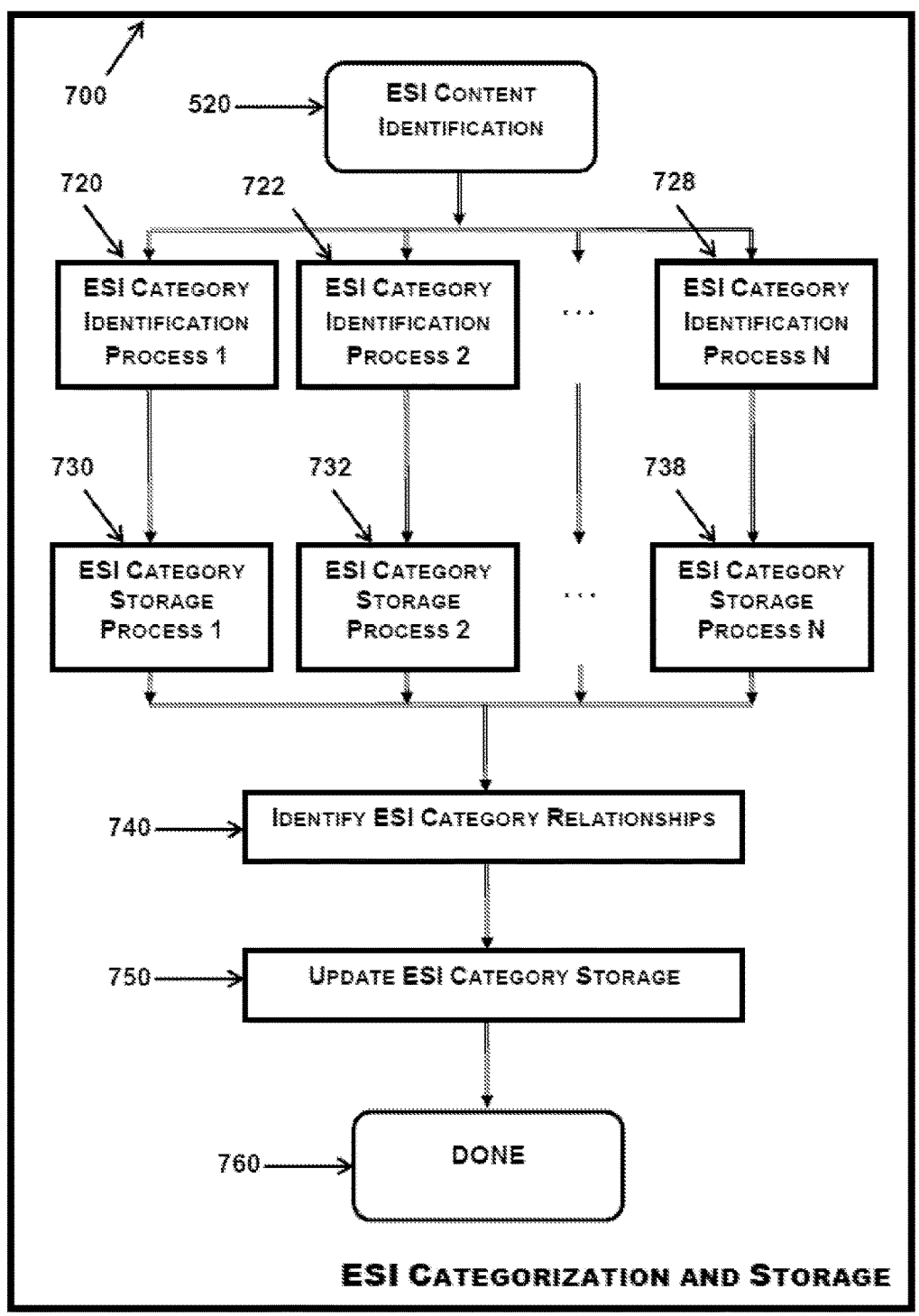
FIG. 7 depicts an example method for the categorization and storage sub-workflow, according to an implementation.

FIG. 7 depicts an embodiment of Content Categorization Sub-workflow: ESI Categorization and Storage 700, which identifies categories and relationships between and among textual token groups, categories, ESI, and data item relationships, and stores categories and relationships in electronic storage (e.g., 260, 270, etc.). In some embodiments, FIG. 7 may depict further steps that are included in the ESI Categorization and Storage 530 of FIG. 5, Document Categorization Workflow 500.

In an implementation, an embodiment of ESI Categorization and Storage 700 begins with ESI Content Identification 520 step as depicted in FIG. 5, Document Categorization Workflow 500. Upon completion of Content Categorization Sub-workflow: ESI Content Identification 600, Content Categorization Sub-workflow: ESI Categorization and Storage 700 implements ESI Category Identification Processes 720 . . . 728. The number of processes started depends on the number of processors in the computing environment of the system 100. In some embodiments only one processor can be used.

In this embodiment of ESI Category Identification Processes 720 . . . 728 steps, identified common content is grouped into a set of categories based on content of the textual tokens and textual token textual token groups within the ESI imported. In some embodiments, these categories represent high level concepts common to more than one data item. These categories of concepts are represented by multiple groups of textual tokens using equivalent textual tokens, equivalent groups of textual tokens, and positional information of textual tokens within groups.

Continuing with FIG. 7, in this embodiment of Content Categorization Sub-workflow: ESI Categorization and Storage 700, the embodiment of ESI Category Identification Processes 720 . . . 728 steps on one or more processors. ESI Category Storage Processes 730 . . . 738 store categories and category related data and calculations in a repository amenable to retrieval and additional analytic and entropy calculations performed after ESI Category Storage Processes 630 . . . 638 steps have completed.

In this embodiment, upon completion of one or more ESI Category Storage Processes 730 . . . 738, the Identify ESI Category Relationships 740 step begins identification of category relationships by considering temporal, positional, and equivalence data derived from textual tokens and textual token textual token groups as well as metadata from data items 150, 152 . . . 158. In this embodiment, relationships are assessed using analytic and entropy calculations including probabilities, frequencies, and entropy calculations. These calculations may be used to rank textual token groups and categories as to likelihood equivalent meaning, and provide confidence measurement of the consistency of user markings during review.

Concluding FIG. 7, Content Categorization Sub-workflow: ESI Categorization and Storage 700, in this embodiment the Update ESI Category Storage 750 step stores relationships, confidence measurements, and other data useful in assessing categorization accuracy, user review consistency, and other functions performed hereafter as described in FIGS. 8, 9, and 10. Content Categorization Sub-workflow: ESI Categorization and Storage 700 concludes when Update ESI Category Storage 750 completes.

Figure 8:
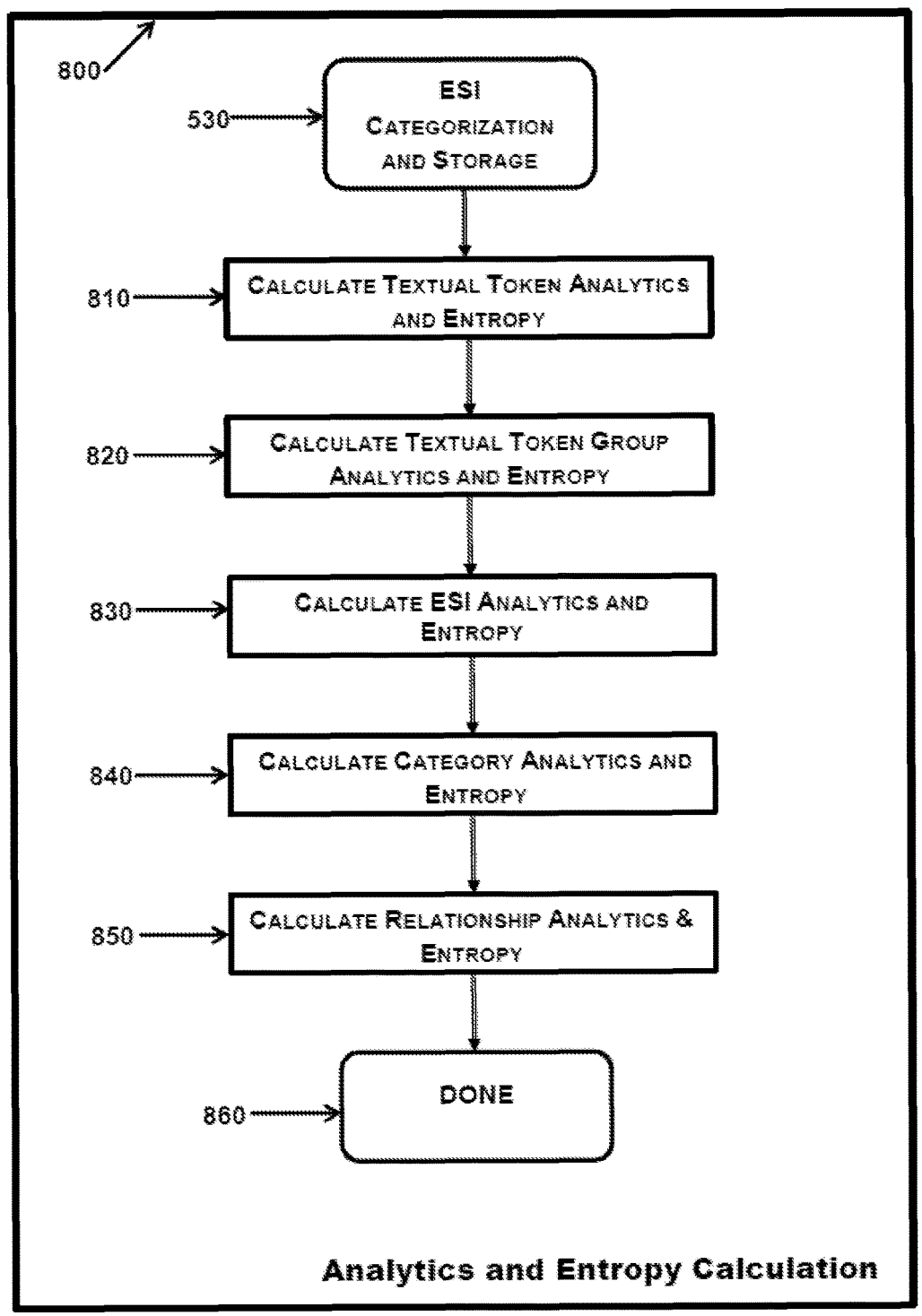
FIG. 8 depicts an example method for the analytics and entropy calculation sub-workflow, according to an implementation.

FIG. 8 depicts an example method for Content Categorization Sub-workflow: Analytics and Entropy Calculation 800 for calculating analytics and entropy based on the completion of the initial categorization analysis. In some embodiments, FIG. 8 may depict further steps that are included in the Analytics and Entropy Calculation 540 of FIG. 5, Document Categorization Workflow 500.

An embodiment of Analytics and Entropy Calculation 800 begins with conclusion of ESI Categorization and Storage 530 depicted in FIG. 5, Document Categorization Workflow 500. Calculate Textual Token Analytics and Entropy 810 calculates analytics and entropy for equivalent textual tokens, which may be textual tokens in multiple different languages or in a combination of two or more languages. In some embodiments these calculations include textual token frequency and probability within a data item and across data items 150, 152 . . . 158, positional frequency as in the position of a textual token within a sequence of two or more textual tokens, frequency in common content as in the frequency of equivalent textual tokens within a data item and across data items 150, 152 . . . 158, frequency of a textual tokens within each category or across categories of textual token groups with equivalent meaning, and other quantitative measures derived from these calculations that quantify the use or presence of a textual token in the imported ESI from one or more data items 150, 152 . . . 158.

In the embodiment shown in FIG. 8, the Calculate Textual Token Group Analytics and Entropy 820 step calculates analytics and entropy for groups of two or more textual tokens occurring within a data source. In some embodiments such groups, which may also be considered textual token groups, of textual tokens may be grouped based on meaning. Calculate Textual Token Group Analytics and Entropy 820 calculates the probability and frequency of textual token groups within a data item and across data items 150, 152 . . . 158, positional frequency as in the position of the textual token group within a sequence of two or more textual token groups, frequency of common content as in the frequency of equivalent textual token groups within a data item and across data items 150, 152 . . . 158, frequency of a textual token groups within each category or across categories of textual token groups with equivalent meaning, and other quantitative measures derived from these calculations that quantify the use or presence of textual token groups in the imported ESI from one or more data items 150, 152 . . . 158.

Continuing with FIG. 8, the embodiment of Calculate ESI Analytics and Entropy 830 step calculates analytics and entropy for ESI and data items 150, 152 . . . 158 utilizing textual tokens, textual token group, and category data. In this example embodiment individual ESI is defined as a sequence of textual token groups such as sentences, paragraphs, pages, and attached or embedded textual token data within a data item such as a document attached to an email. In an implementation, calculate ESI Analytics and Entropy 830 calculates the probability and frequency of ESI within a data item and across data items 150, 152 . . . 158, positional frequency as in the position of ESI within a sequence of two or more ESI items, frequency of common content as in the frequency of equivalent ESI within a data item and across data items 150, 152 . . . 158, frequency of ESI items associated with categories, and other quantitative measures derived from these calculations that quantify the use or presence of ESI items in one or more data items 150, 152 . . . 158.

In an embodiment, Calculate Category Analytics and Entropy 840 step makes use of updated textual token, textual token group, and ESI calculations to revise category analytics and entropy. In some embodiments such revision may be minor when the calculations performed previously in Calculate ESI Analytics and Entropy 830 can be combined from or already exist from previous analytics and entropy calculations for one or more identified categories. In some embodiments the Calculate Category Analytics and Entropy 840 step normalizes calculations by utilizing unique textual token, unique textual token group, and ESI data which eliminates the influence of duplicative textual tokens, duplication textual token groups, and duplicative ESI on frequency and probability calculations. In some embodiments this step serves as an accuracy and precision check for previously calculated and stored analytics and entropy.

Continuing to describe the example embodiment shown in FIG. 8, Analytics and Entropy Calculation 800 concludes with Calculate Relationship Analytics & Entropy 850. In this embodiment Calculate Relationship Analytics and Entropy 850 analyzes the frequency and probability of textual tokens, textual token groups, categories, and ESI for one or more data items 150, 152 . . . 158 to identify relationships between and among textual tokens, textual token groups, categories, and ESI items, between and among data items 150, 152 . . . 158. Relationship strength in this example embodiment quantitatively assesses the frequency and probability of data items 150, 152 . . . 158 containing textual tokens, groups of textual tokens, categories, and ESI items. In this embodiment, the frequency and probability of textual tokens, textual token groups, and ESI occurring in data items 150, 152 . . . 158 is also calculated. The process 800 ends at block 860.

Figure 9:
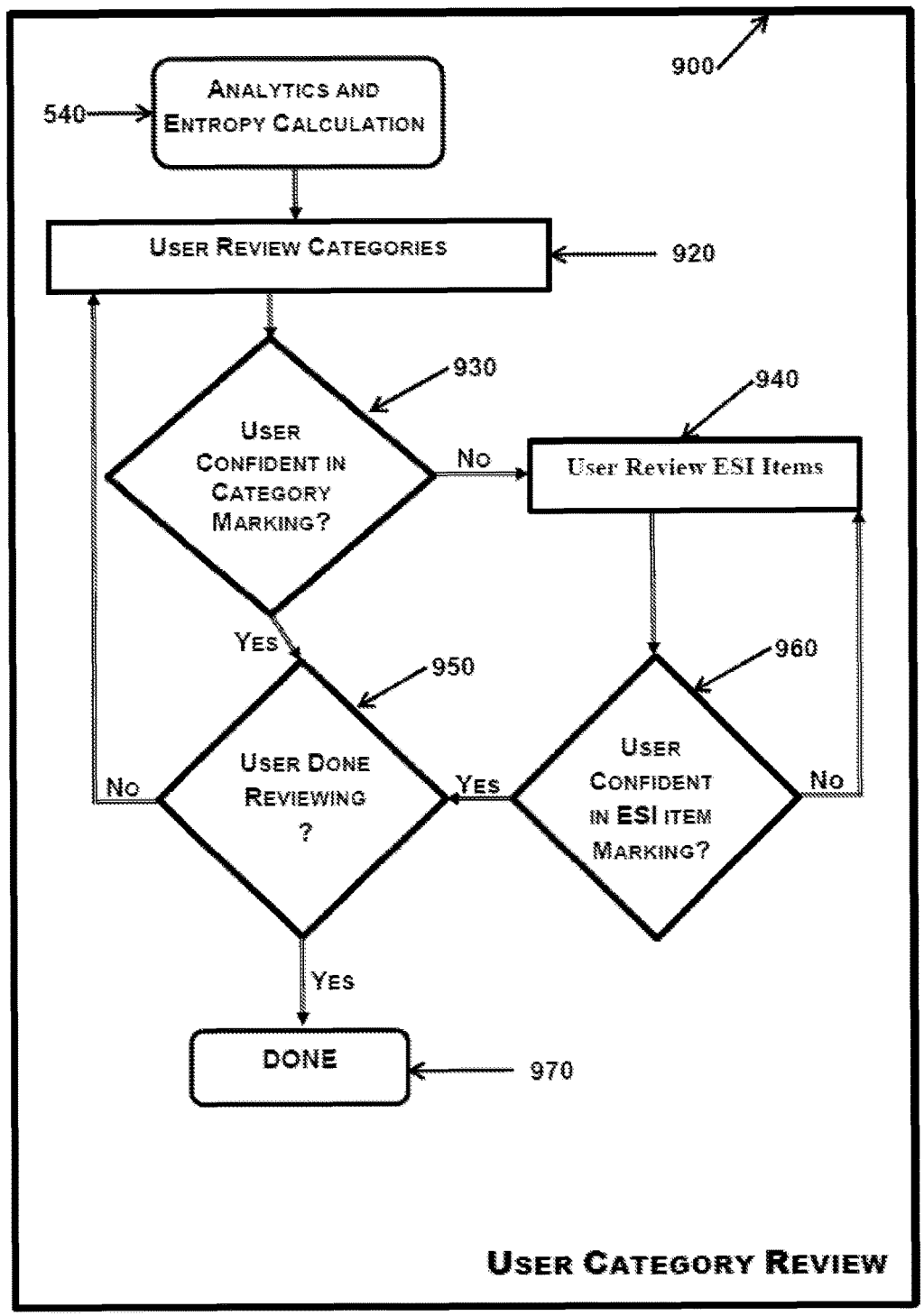
FIG. 9 depicts an example method for the user category review sub-workflow, according to an implementation.

FIG. 9 depicts an example embodiment of Content Categorization Sub-workflow: User Category Review 900 for user review and interaction with textual tokens, textual token groups, and categories of ESI, as well as data items 150, 152 . . . 158. In some embodiments, FIG. 9 may depict further steps that are included in the User Category Review Calculation 550 of FIG. 5, Document Categorization Workflow 500.

Referring to FIG. 9, the example embodiment of User Category Review 900 begins with the conclusion of Analytics and Entropy Calculation 540 depicted in FIG. 5, Document Categorization Workflow 500. The example embodiment of the User Review Categories 920 step presents analysis and categorization results to a user in a form allowing review of textual tokens, textual token groups, categories, ESI, and data items 150, 152 . . . 158 as well as relationships among and between textual tokens, textual token groups, categories, ESI, and data items 150, 152 . . . 158. For example, the results may be displayed on a user interface of a visualization device 250, or may be presented in a paper form, or as a function executed in another process, for example.

In an implementation, a user can provide input (via input device 240, for example) and revise textual token, textual token group, categories, ESI, and data item relationships during review by marking textual tokens, textual token groups, categories, ESI, and data items 150, 152 . . . 158. In this example embodiment a user may move textual token groups into or out of equivalent categories to more accurately reflect equivalent meaning. A user may also revise relationships between and among textual tokens, textual token groups, categories, ESI, and data items 150, 152 . . . 158. In this embodiment, such revisions will propagate through the data set, changing equivalencies between textual tokens, textual token groups, categories, ESI, and data items 150, 152 . . . 158 to accurately reflect user actions. The transformation of data items 150, 152 . . . 158 into categories of textual content allows user actions to be reflected across the textual token groups, categories, ESI, and data items 150, 152 . . . 158.

In FIG. 9, of the example embodiment of User Category Review 900 allows a user to work toward completing review, which proceeds forward as a user makes decisions in "User Confident in Category Marking?" block 930. If the user is not confident that the ESI associated with a category containing common content, a user can proceed to User Review ESI Items 940. User review of ESI items allows the user to change markings for one or more ESI or data items 150, 152 . . . 158, move the ESI or data item to another category, delete the ESI or data item from a category, or perform other actions. In this embodiment of User Review ESI Items 940 such actions immediately update textual token, textual token group, category, ESI, and data item analytics and entropy calculations as well as quantitative confidence calculations for textual token, textual token group, category, ESI item, and data items 150, 152 . . . 158. In some embodiments this allows a user to immediately review and assess progress toward completion of review of textual token group, category, ESI and data items 150, 152 . . . 158.

As shown in FIG. 9, the example embodiment of User Review ESI Items 940 step continues through one or more ESI items as long as the user answers the User Confident in ESI item Marking? 960 negatively. However, if the user achieves confidence in the markings, or from some other criteria, the user proceeds through the User Confident in ESI item Marking? 960 with a positive response and can then consider the question as to the decision User Done Reviewing? 950. If a user is done reviewing, based on user criteria, or any other criteria, a user can conclude user review activities. However, if a user determines review has not completed by answering User Done Reviewing? 950 negatively, the user returns to User Review Categories 920 to proceed with category and/or ESI review as previously specified.

Figure 10:
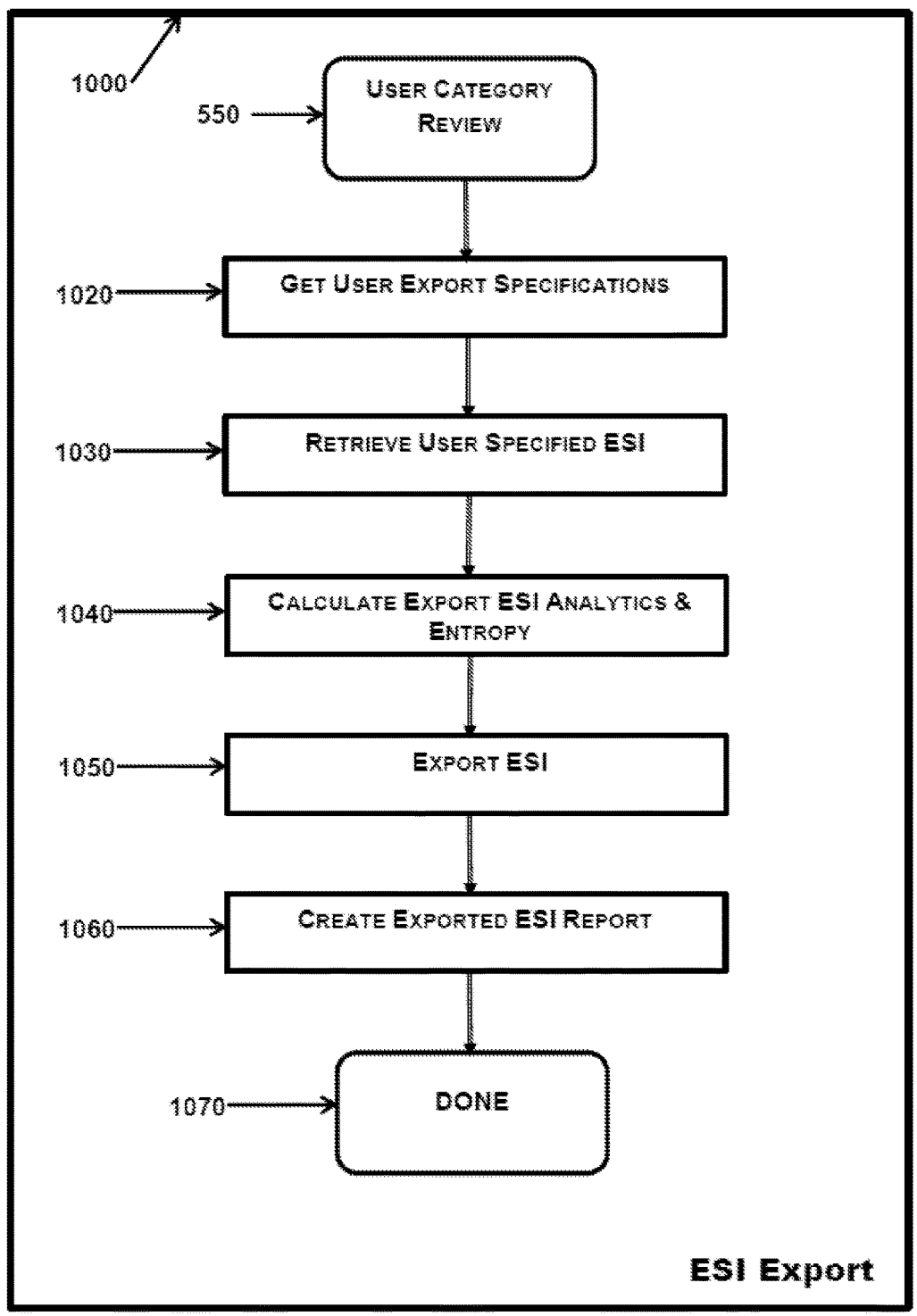
FIG. 10 depicts an example method for the electronically stored information export sub-workflow, according to an implementation.

FIG. 10 depicts an example embodiment of Content Categorization Sub-workflow: ESI Export 1000 for exporting textual tokens, textual token groups, categories, ESI, data items 150, 152 . . . 158, or any combination of these. In some embodiments, FIG. 10 may depict further steps that are included in the ESI Export 560 of FIG. 5, Document Categorization Workflow 500.

Referring to FIG. 10, the example embodiment of ESI Export 1000 step begins with the conclusion of User Category Review 550 was depicted in FIG. 5, Document Categorization Workflow 500. However, other embodiments permit export without User Category Review 550 or at any time during User Category Review 550.

In an implementation, Get User Export Specifications 1020 prompts the user for export specifications, performs a consistency check against user project requirements (such as required confidence levels, ESI review thoroughness, and other user defined project requirements) and then creates export specifications. These specifications in this embodiment provide the parameters needed to retrieve categories, ESI, and data items 150, 152 . . . 158 as well as analytics, entropy, and audit data.

Using the user-input export specification, the example embodiment of Retrieve User Specified ESI 1030 retrieves categories, ESI, and data items 150, 152 . . . 158 as well as analytics, entropy, and audit data from a repository which may be a database, internal memory, external permanent storage, or other data storage medium. In this embodiment the export specification will be placed in the repository for auditing or other archival purposes.

The example embodiment of the Calculate Export ESI Analytics & Entropy 1040 step analyzes the export specification, exported data, and exported and data items 150, 152 . . . 158, as well as other needed information, in order to calculate analytics and entropy measurements specific to the exported ESI and data items 150, 152 . . . 158. In this embodiment the analytics and entropy measurements may include percentage of textual tokens, textual token groups, categories, ESI, and data items 150, 152 . . . 158 exported, percentage of textual tokens, textual token groups, categories, ESI items, and data items 150, 152 . . . 158 exported that were user reviewed, marked, remarked, and revised, as well as analytics such as confidence level in user marking of each textual token group, category, ESI item, and data item 150, 152 . . . 158, raw data as to the markings of textual word groups, categories, ESI items, and data items 150, 152 . . . 158, as well as other user requested measurements.

Once Calculate Export ESI Analytics & Entropy 1040 completes, the example embodiment of the Export ESI 1050 step accomplishes the task of exporting the user selected ESI and data items 150, 152 . . . 158. In this embodiment such export will produce ESI and data items 150, 152 . . . 158 in user specified formats, including plain text, word processing formats such Microsoft Word, PDF, or other user defined file format.

The example embodiment of ESI Export 1000 method ends with the Create Exported ESI Report 1050 step. An ESI report provides a user friendly and informative report describing user review actions, textual word group, category, ESI, and data item markings, textual word groups, categories, ESI items, and data items 150, 152 . . . 158 exported, and analytics and entropy measures from data items 150, 152 . . . 158 and the export specifications.

Various embodiments allow for alteration in implementation of steps and the sequence of steps described herein. An embodiment may be implemented that alters one or more of the methods described herein, methods and steps may be removed or replaced with other steps and still be within the scope of the disclosure. Any of the steps or methods described herein may be combined, moved, or modified for other methods described herein and still be within the scope of the disclosure. In an embodiment the elements, steps, or methods of the FIGS. 1-10, may be combined, added, modified, moved, executed sequentially or in parallel and still remain within the scope of the disclosure.

Some of the previously described methods and steps may be composed of instructions stored on a storage media, permanent fixed or permanent mobile, or any other such media. The instructions may be retrieved and executed in a computing environment such as the multiprocessor or single processor computing environment.

It is noted here that in the computing environment embodying the disclosure may be reconfigured or repurposed to implement various embodiments providing an environment for transforming textual data items 150, 152 . . . 158 into categorized content allowing users to search, sort, review, or otherwise interact with the data items 150, 152 . . . 158 based on the meaning of textual tokens within the data items 150, 152 . . . 158. While some embodiments take advantage of multiprocessor computing environments for faster execution, an embodiment can be executed effectively on a single processor computing environment, and therefore will still be within the scope of this disclosure.

The previous method and step descriptions are illustrative and not restrictive in any sense, interpretation, or meaning. The scope of this disclosure should not be limited in any way by the embodiments described herein. Instead, the embodiments described herein should be understood to include the ability to categorize content generally, without the need for user input or direction as to desired outcomes, and functional ability to perform these and other generally described methods and steps quickly, accurately, and completely in a single or multiprocessor computing environment. The present descriptions of this disclosure should be further understood to cover modifications, alternatives, and equivalent methods, steps, and functions within the spirit and purpose of the disclosure.

Portions of the subject matter of this disclosure can be implemented as a system, method, apparatus, or article of manufacture using standard programming and/or engineering techniques to produce software, firmware, hardware or any combination thereof to control a computer or processor (such as included in computational system 120, for example) to implement the disclosure. For example, portions of an example system 100 may be implemented using any form of computer-readable media (shown as fixed and mobile storage 260, 270 in FIG. 2, for example) that is accessible by one or more of the processors 210, 212 . . . 218. Computer-readable media may include, for example, computer storage media and communications media.

Computer-readable storage media includes volatile and nonvolatile, removable and non-removable media implemented in any method or technology for storage of information such as computer-readable instructions, data structures, program modules or other data. Memory (permanent fixed storage) 260 is an example of computer-readable storage media. Permanent mobile storage 270, which may comprise local, network, or cloud storage, for example, is another example of computer-readable storage media. Additional types of computer-readable storage media that may be present include, but are not limited to, RAM, ROM, EEPROM, flash memory or other memory technology, CD-ROM, digital versatile disks (DVD) or other optical storage, magnetic disks or other magnetic storage devices, or any other medium which may be used to store the desired information and which may accessed by the processors 210, 212 . . . 218.

In contrast, communication media typically embodies computer readable instructions, data structures, program modules, or other data in a modulated data signal, such as a carrier wave, or other transport mechanism.

While the subject matter has been described above in the general context of computer-executable instructions of a computer program that runs on a computer and/or computers, those skilled in the art will recognize that the subject matter also may be implemented in combination with other program modules. Generally, program modules include routines, programs, components, data structures, and the like, which perform particular tasks and/or implement particular abstract data types.

Moreover, those skilled in the art will appreciate that the innovative techniques can be practiced with other computer system configurations, including single-processor or multiprocessor computer systems, mini-computing devices, mainframe computers, as well as personal computers, handheld or mobile computing devices, microprocessor-based or programmable consumer or industrial electronics, and the like. The illustrated aspects may also be practiced in distributed computing environments where tasks are performed by remote processing devices that are linked through a communications network. However, some, if not all aspects of the disclosure can be practiced on stand-alone computers. In a distributed computing environment, program modules may be located in both local and remote memory storage devices.

As discussed above, the techniques, components, and devices described herein with respect to the implementations are not limited to the illustrations of FIGS. 1-10, and may be applied to other devices, and designs, without departing from the scope of the disclosure. In some cases, additional or alternative components, techniques, sequences, or processes may be used to implement the techniques described herein. Further, the components and/or techniques may be arranged and/or combined in various combinations, while resulting in similar or approximately identical results. It is to be understood that a system 100 may be implemented as a stand-alone device or as part of another system (e.g., integrated with other components, systems, etc.). In various implementations, additional or alternative components may be used to accomplish the disclosed techniques and arrangements.

Conclusion

While various discreet embodiments have been described throughout, the individual features of the various embodiments may be combined to form other embodiments not specifically described. The embodiments formed by combining the features of described embodiments are also within the scope of the disclosure.

What is claimed is:

1. Computer-readable storage media, having computer-executable instructions stored thereon, that when executed, cause one or more computer processors to initiate a process, comprising:

importing multiple data items into a computational system arranged to automatically organize portions of the data items into a searchable form, the data items comprising an email, an electronic file, an electronic document, text message, data from a database, and/or content of a web page;

parsing the multiple data items into components comprising text, images, and/or metadata, and the components into textual tokens comprising single textual characters, symbols, digits, and/or punctuation;

grouping textual tokens into textual groups comprising sets of textual tokens, words, phrases, misspelled words, and/or foreign language words;

identifying textual tokens and textual groups having an equivalent meaning based on contextual relationships of the textual tokens and the textual groups within the components of the multiple data items, the relationships including a quantity of textual tokens or textual groups, a position within a set of textual tokens or textual groups, an occurrence of a textual token or textual group in a plurality of components and/or data items, and a sequence of textual tokens or textual groups;

generating a thesaurus tool of textual tokens and/or textual groups, based on the equivalent meaning and equivalent relationships among and between textual tokens and textual groups;

categorizing the components of the multiple data items based on the identifying and the thesaurus tool, the categorizing including indexing and storing the data items, the components, the textual tokens, and/or the textual groups;

analyzing the textual tokens and textual groups to resolve content ambiguity, to refine relationships, and/or to refine categorization;

reviewing the categorization using the indexing, and marking selected textual tokens, textual groups, and/or components;

concurrently propagating the marking throughout the multiple data items to textual tokens, textual groups, and/or components having an equivalent meaning; and exporting a portion of the multiple data items and/or the components as determined by user-selected categories, indices, and/or relationships, the exporting including creating one or more reports and/or outputting textual tokens, textual groups, and/or components having an equivalent meaning to a user interface of the computational system.

2. The computer-readable storage media of claim 1, wherein the computational system comprises a mobile device and the computer-executable instructions are operative on one or more processors of the mobile device to receive the data items via a network connection and to export user-specified search results via a user-interface of the mobile device.

3. A system, comprising:
one or more processors;
an import module arranged to import multiple electronic data items;
a memory hardware device communicatively coupled to the one or more processors;
a content categorization module stored in the memory hardware device and operative on the one or more processors to:
parse the multiple data items into components, and the components into textual tokens;
identify textual tokens having an equivalent meaning based on contextual relationships of the textual tokens within the components of the multiple data items, the relationships including a quantity of textual tokens or textual groups, a position within a set of textual tokens or textual groups, an occurrence of a textual token or textual group in a plurality of components and/or data items, and a sequence of textual tokens or textual groups;
generate a thesaurus tool, based on the equivalent meaning and the relationships;
categorize the components of the multiple data items based on the identifying and the thesaurus tool, the categorizing including indexing and storing the components;
analyze the textual tokens to resolve content ambiguity, to refine relationships, and/or to refine categorization;
review the categorization using the indexing, and marking selected textual tokens and/or components; and
concurrently propagate the marking throughout the multiple data items to textual tokens and/or components having an equivalent meaning; and
an output device arranged to export a portion of the multiple data items and/or the components as determined by a user-selected category, index, and/or relationship.

4. The system of claim 3, further comprising a text grouping module arranged to select and combine textual tokens into groups of two or more textual tokens that are amenable to content analysis, and which may include multiple languages.

5. The system of claim 3, further comprising a textual group content identification module arranged to identity a meaning of textual tokens and groups of textual tokens using one or more thesaurus files created during analysis of the multiple data items.

6. The system of claim 3, further comprising an Electronically Stored Information content identification module arranged to import components to categorize, textual group the components, determine equivalent textual tokens, determine equivalent content, and determine component common content.

7. The system of claim 3, further comprising an Electronically Stored Information categorization and storage module arranged to identify a category for a component, store the component by category, identify relationships for the component, and update the storage category of the component.

8. The system of claim 3, further comprising an Electronically Stored Information relationship identification module arranged to identify multiple, distinct components as being related based on having a common meaning across multiple data items.

9. The system of claim 3, further comprising an analytics and entropy calculation module arranged to calculate textual token analytics and entropy, calculate textual token group analytics and entropy, calculate category analytics and entropy, an calculate relationship analytics and entropy.

10. The system of claim 3, further comprising a user category review module arranged to provide review tools to a user for reviewing categories and components and to provide for marking components as relevant, non-relevant, privileged, or a user-customized marking.

11. The system of claim 3, further comprising an Electronically Stored Information export module arranged to receive user export specifications, retrieve user specified components, calculate export components analytics and entropy, export the components, and to create an exported component report.

12. A method, comprising:
importing multiple data items into a computational system arranged to automatically organize portions of the data items into a searchable form;
parsing the multiple data items into components, and the components into textual tokens;
identifying textual tokens having an equivalent meaning based on contextual relationships of the textual tokens within the components of the multiple data items, the relationships including a quantity of textual tokens or textual groups, a position within a set of textual tokens or textual groups, an occurrence of a textual token or textual group in a plurality of components and/or data items, and a sequence of textual tokens or textual groups;
generating a thesaurus tool, based on the equivalent meaning and the relationships;
categorizing the components of the multiple data items based on the identifying and the thesaurus tool, the categorizing including indexing and storing the components;
analyzing the textual tokens to resolve content ambiguity, to refine relationships, and/or to refine categorization;
reviewing the categorization using the indexing, and marking selected textual tokens and/or components;
concurrently propagating the marking throughout the multiple data items to textual tokens and/or components having an equivalent meaning; and
exporting a portion of the multiple data items and/or the components as determined by a user-selected category, index, and/or relationship.

13. The method of claim 12, further comprising receiving a free form text search inquiry from a user and generating content sequences which are compared for equivalence across all imported data items, allowing the user to screen a changing or streaming data item for emails, documents, or other data of interest.

14. The method of claim 12, further comprising searching the data items based on a user-defined specification and outputting reports, data items, components, categories, and/or groups of textual tokens using the categories, the indices, and relationships.

15. The method of claim 12, further comprising identifying textual tokens, words, or phrases having an equivalent meaning without the use of exact word matches, logic connecting exact word matches, predefined word, phrase, or sentence relationships, preloaded thesauruses, preset user inquiries, or machine learning algorithms using training sets.

16. The method of claim 12, further comprising determining equivalent meanings of words or phrases when one or more words are misspelled, when the words or the phrases include an acronym, when the words or the phrases include derivative forms of proper names, and/or when the words or the phrases are derived from an optical character recognition (OCR) process.

17. The method of claim 12, further comprising determining that two words have an equivalent meaning when the words begin two otherwise equivalent sequences of words and determining that the two otherwise equivalent sequences of words are equivalent.

18. The method of claim 12, further comprising determining that two different words have an equivalent meaning when the words occur in the same position within two multiword sequences with otherwise equivalent words and determining that the two multiword sequences are equivalent in meaning.

19. The method of claim 12, further comprising analyzing the textual tokens to resolve content ambiguity via natural language analysis and/or information theory.

20. The method of claim 12, further comprising determining an equivalent meaning for a sequence of textual tokens or groups of textual tokens based on a common position of a textual token or a group of textual tokens within the sequence, equivalence derived from a unique thesaurus tool generated for a unique set of data items, and/or sequences of textual tokens or groups of textual tokens preceding and/or succeeding each sequence of textual tokens or groups of textual tokens.

* * * * *